(12) United States Patent
Liao et al.

(10) Patent No.: US 11,492,267 B2
(45) Date of Patent: Nov. 8, 2022

(54) METHODS AND PROCESSES FOR FLAME-ASSISTED DIRECT RECYCLING AND UPCYCLING OF SPENT CATHODE MATERIALS

(71) Applicant: Storagenergy Technologies Inc., Salt Lake City, UT (US)

(72) Inventors: Jinyun Liao, Herriman, UT (US); Junhua Song, South Jordan, UT (US); Nick Iacopino, Salt Lake City, UT (US); Feng Zhao, Salt Lake City, UT (US)

(73) Assignee: Storagenergy Technologies Inc., Salt Lake City, UT (US)

( * ) Notice: Subject to any disclaimer, the term of this patent is extended or adjusted under 35 U.S.C. 154(b) by 0 days.

(21) Appl. No.: 17/591,476

(22) Filed: Feb. 2, 2022

(65) Prior Publication Data
US 2022/0242747 A1   Aug. 4, 2022

Related U.S. Application Data

(60) Provisional application No. 63/144,646, filed on Feb. 2, 2021.

(51) Int. Cl.
   *C01G 53/00* (2006.01)
   *H01M 10/54* (2006.01)
   *C22B 3/06* (2006.01)

(52) U.S. Cl.
   CPC .......... *C01G 53/44* (2013.01); *H01M 10/54* (2013.01); *C01P 2002/72* (2013.01); *C01P 2002/82* (2013.01); *C01P 2004/03* (2013.01); *C01P 2006/40* (2013.01); *C22B 3/06* (2013.01)

(58) Field of Classification Search
   CPC .......... H01M 10/54; C01G 53/44; C22B 3/06; C01P 2004/03; C01P 2002/72; C01P 2002/82; C01P 2006/40
   See application file for complete search history.

(56) References Cited

U.S. PATENT DOCUMENTS

2020/0078796 A1*   3/2020   Kochhar ................. B02C 23/36

FOREIGN PATENT DOCUMENTS

| AU | 2020203801 B1 | 3/2021 |
| WO | 2022109453 A1 | 5/2022 |

* cited by examiner

*Primary Examiner* — Steven J Bos
(74) *Attorney, Agent, or Firm* — Siepmann IP, PLLC (57) ABSTRACT

Systems and methods for direct recycling and upcycling of spent cathode materials using Flame-Assisted Spray Pyrolysis Technology (FAST). In illustrative embodiments, cathode layers are separated and collected from spent battery cells. The cathode laminate is ground to a powdered form and treated to remove contaminants by sifting into a hot stream of air which heats the powders, burning off contaminants. After cooling and particle collection, the powders may be dispersed into leaching solution to dissolve metal oxides and create an acid metal solution or ground into nano-sized primary particles and mixed with dispersing liquids to form a solution. The solution may be mixed with glycerol and additional metal salts to create a final precursor solution, which may undergo spray pyrolysis followed by drying and calcination to create cathode materials with high consistency and repeatability, or mixed with an alkaline metal salt solution and undergo electrodeposition to recover desired metal salts.

13 Claims, 10 Drawing Sheets

METHODS AND PROCESSES FOR FLAME-ASSISTED DIRECT RECYCLING AND UPCYCLING OF SPENT CATHODE MATERIALS

CROSS-REFERENCE TO RELATED APPLICATION

This application claims the benefit of U.S. Provisional Application No. 63/144,646, filed Feb. 2, 2021, the contents of which are incorporated herein by reference in its entirety, including but not limited to those portions that specifically appear hereinafter.

TECHNICAL FIELD

This disclosure relates to systems, methods, and apparatus for the recycling of cathode materials for the manufacturing of batteries and capacitors.

BACKGROUND

The various chemistries used in Li-ion cells results in variable backend value. Alternatively, unless they get recycled, Li-ion batteries (LIBs) could lead to a shortage of key materials (lithium, cobalt, and nickel) vital to the technology. Considering the fast growth of global demands of LIBs, end-of-life (EOL) LIBs are most likely to become important secondary sources for various materials in the future. Finding ways to decrease the cost of recycling and recycling rate could thus significantly reduce the life cycle cost of electric vehicle (EV) batteries, avoid material shortages, lessen the environmental impact of new material production, and potentially provide low-cost active materials for new EV battery manufacturing. As one of the most promising cathode materials in LIBs, layered oxides, such as $LiNi_xMn_yCo_z$, (NMC, x+y+z=1) (referred to as "NMC") have been drawing much attention due to their high energy density for EV applications. Direct recycling of NMC cathode materials is important to maintain domestic critical material reserves. Current cathode recycling processes include pyrometallurgy, hydrometallurgy and direct recycling. While each has advantages, these also have a number of disadvantages, including $CO_2$ generation, relatively high energy consumption process cost or complexity, the recovery of alloys that require further processing thereby increasing total recycling costs, the inability to recover many of the materials in LIBs, and others.

Similarly, conventional cathode materials synthesis includes aqueous co-precipitation, sol-gel, and solid-state synthesis (e.g., ball mill+high temperature calcination). Each of these processes has inherent problems including multiple, slow, and energy-intensive steps, which hinder high-throughput, direct battery material production.

A recycling process that was less resource and capital intensive, and simpler and faster for cathode recycling would be an improvement in the art. Such a process that was capable of continuous feeding and production would be a further improvement in the art.

SUMMARY

The present disclosure is directed to systems and methods for the direct recycling of spent cathode materials using Flame-Assisted Spray Pyrolysis Technology (FAST).

In one illustrative embodiment, cathode layers are separated and collected from spent EV cells, such as from spent EV pouch cells in a battery assembly. The cathode laminate may be ground to a powdered form and treated to remove contaminants by sifting the powders into a hot stream of air which heats the powders, burning off all contaminants. The resulting particles may then be cooled and collected.

In some embodiments, after particle collection the powders may be dispersed into leaching solution which works to dissolve metal oxides to create an acidic metal solution. The acidic metal solution may then be mixed with glycerol and additional metal acetates to create a final precursor solution.

In some other embodiments, after particle collection the powders may be directed to a suitable mill, such as a jet-mill, or a series of jet-mills. The mill(s) grind the spent secondary cathode powder into nano-sized primary particles in a continuous manner. In some embodiments, the particles may be mixed and/or coated with cathode precursors at different stages of jet-milling. Once jet-milling is complete, the produced nano-particles may then be collected and re-dispersed in a glycerol solution to create a final precursor solution or suspension.

In some embodiments, the final precursor solution may then undergo spray pyrolysis by being pumped into the spray chamber along with compressed air, where it is dried and calcinated, creating cathode materials with high consistency and repeatability.

Spray pyrolysis may include the injection of the precursor solution containing lithium source, metal salt and metal oxide particles in solvent at the top of a large spray chamber. A stream of hot air may be simultaneously heated and introduced to the system at the bottom of the spray chamber. A heat gradient is observed from the bottom of the chamber to the top, as the inlet air spirals vertically upward around the walls, generically indicated by arrow 2205. Micro-droplets of the precursor solution mix with the hot air at the inlet and reduce in size as excess solvent is evaporated, resulting in a micron-sized spherical dry salt particle (in the case of leaching solution) or dry salt/metal oxide particle (in the case of jet-milling).

Continuous air flow will direct the dried particles produced in the spray drying zone to the bottom of the spray chamber, then through a flame heating zone to achieve final well calcined materials. Once the product particles have calcined to the desired crystal structure in the flame-Heating zone, air flow may push the products to a cooling zone, following which particle collection may take place.

In some other embodiments, the final precursor solution may instead be mixed with an alkaline solution to form an electrolyte for electrochemical deposition of target metal salts. This can allow for the selective recovery of specific target metals.

DESCRIPTION OF THE DRAWINGS

It will be appreciated by those of ordinary skill in the art that the various drawings are for illustrative purposes only. The nature of the present disclosure, as well as other embodiments in accordance with this disclosure, may be more clearly understood by reference to the following detailed description, to the appended claims, and to the several drawings.

DETAILED DESCRIPTION

The present disclosure relates to apparatus, systems, and methods for the direct recycling of spent cathode materials for the manufacturing of batteries. It will be appreciated by those skilled in the art that the embodiments herein described, while illustrative, are not intended to limit this disclosure or the scope of the appended claims. Those skilled in the art will also understand that various combinations or modifications of the embodiments presented herein can be made without departing from the scope of this disclosure. All such alternate embodiments are within the scope of the present disclosure.

The various chemistries used in Li-ion cells results in variable backend value. Alternatively, unless they get recycled, Li-ion batteries (LIBs) could lead to a shortage of key materials (lithium, cobalt, and nickel) vital to the technology. Considering the fast growth of global demands of LIBs, end-of-life (EOL) LIBs are most likely to become important secondary sources for various materials in the future. Finding ways to decrease the cost of recycling and recycling rate could thus significantly reduce the life cycle cost of electric vehicle (EV) batteries, avoid material shortages, lessen the environmental impact of new material production, and potentially provide low-cost active materials for new EV battery manufacturing. As one of the most promising cathode materials in LIBs, layered oxides, such as $LiNi_xMn_yCo_z$, (NMC, x+y+z=1) (NMC) have been drawing much attention due to their high energy density for EV applications. Direct recycling of NMC cathode materials is important to maintain domestic critical material reserves. The Flame-Assisted Spray Pyrolysis Technology (FAST) approach in accordance with the present disclosure is a closed-loop recycling process to directly recycle NMC materials from spent cathode scraps. Different from industrial available hydrometallurgical recycling processes, in which the recovered materials are meal oxides or raw metal alloys, the proposed closed-loop recycling process will produce industrial-grade cathode material directly from recycling stream. This technique eliminates the conventional calcination step resulting in a time/energy-effective process. In addition, such processes are relatively "green" as they may employ spent cathode scraps, acetate acid and environmentally friendly biomass-derived glycerol-based precursors, which can eliminate the toxic gases released during the recycling process. In comparison to current known processes, the FAST approaches in accordance with the present disclosure may result in relatively shorter production process with a high throughput, sufficient to make on-site recycling possible may result in a recovered cathode material have equal or, in some instances, better electrochemical performance compared with current commercial cathode material; and/or may be relatively easy to scale up for cathode material mass recycling at a low cost.

Spray pyrolysis may include the injection of the precursor solution containing lithium source, metal salt and metal oxide particles in solvent at the top of a large spray chamber. A stream of hot air may be simultaneously heated and introduced to the system at the bottom of the spray chamber. A heat gradient is observed from the bottom of the chamber to the top, as the inlet air spirals vertically upward around the walls. Micro-droplets of the precursor solution mix with the hot air at the inlet and reduce in size as excess solvent is evaporated, resulting in a dry salt particle (in the case of leaching solution) or a dry salt/metal oxide particle (in the case of jet-milling).

Continuous air flow may be used to direct the dried particles produced in the spray drying zone to the bottom of the spray chamber, then through a flame heating zone to achieve final well calcined materials. Once the product particles have calcined to the desired crystal structure in the flame-heating zone, air flow may push the products to a cooling zone, following which particle collection may take place.

It is also noted that the in some embodiments, the relatively early crystallization in glycerolate formation at low temperatures can significantly improve the crystallinity of NMC cathode and that since glycerol is itself a fuel, and its combustion can provide heat energy for materials processing, which can reduce the calcination temperature and time for less energy consumption.

Figure 1A:
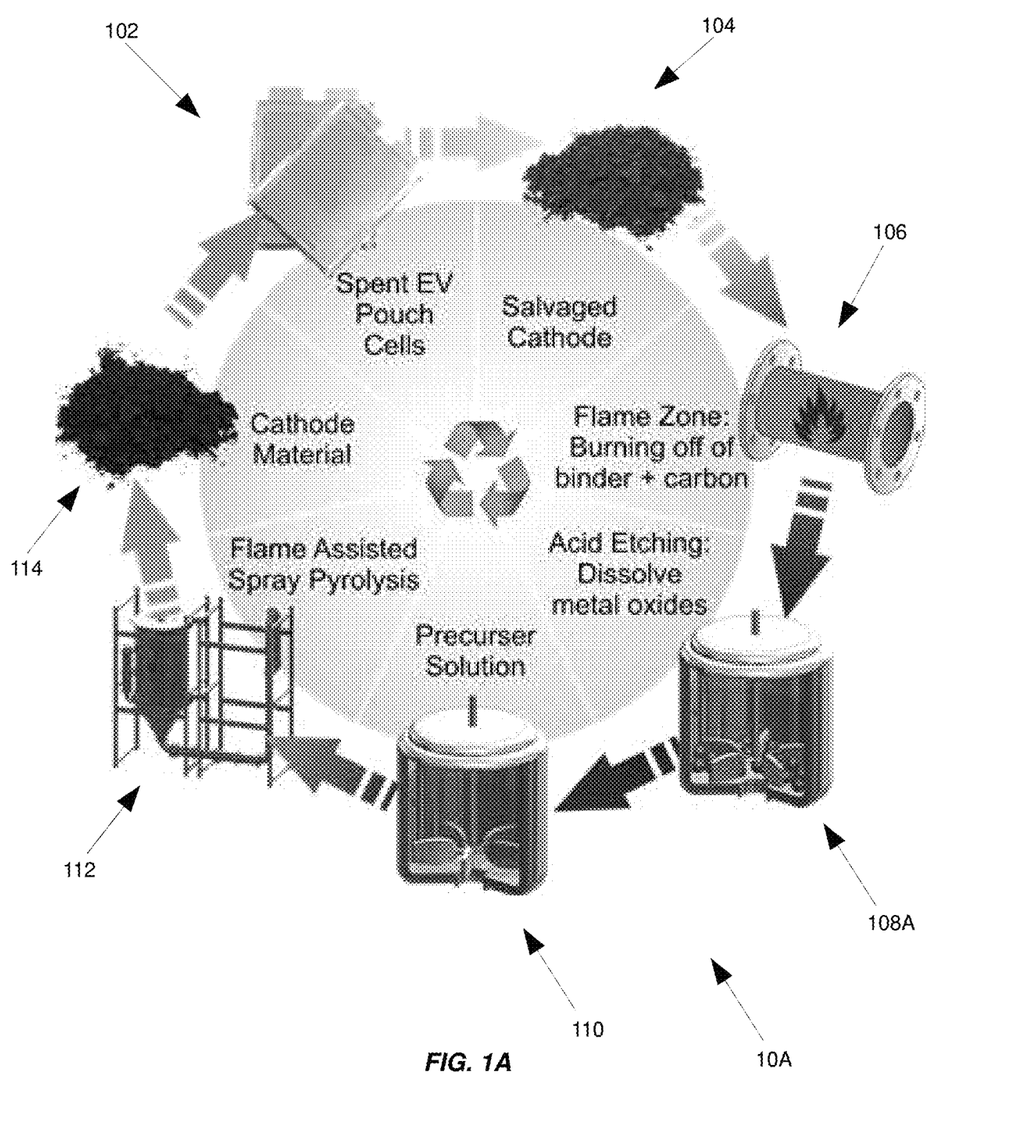
FIGS. 1A and 1B are process diagrams providing an overview of closed loop recycling processes in accordance with the principles of the present disclosure.
Figure 1B:
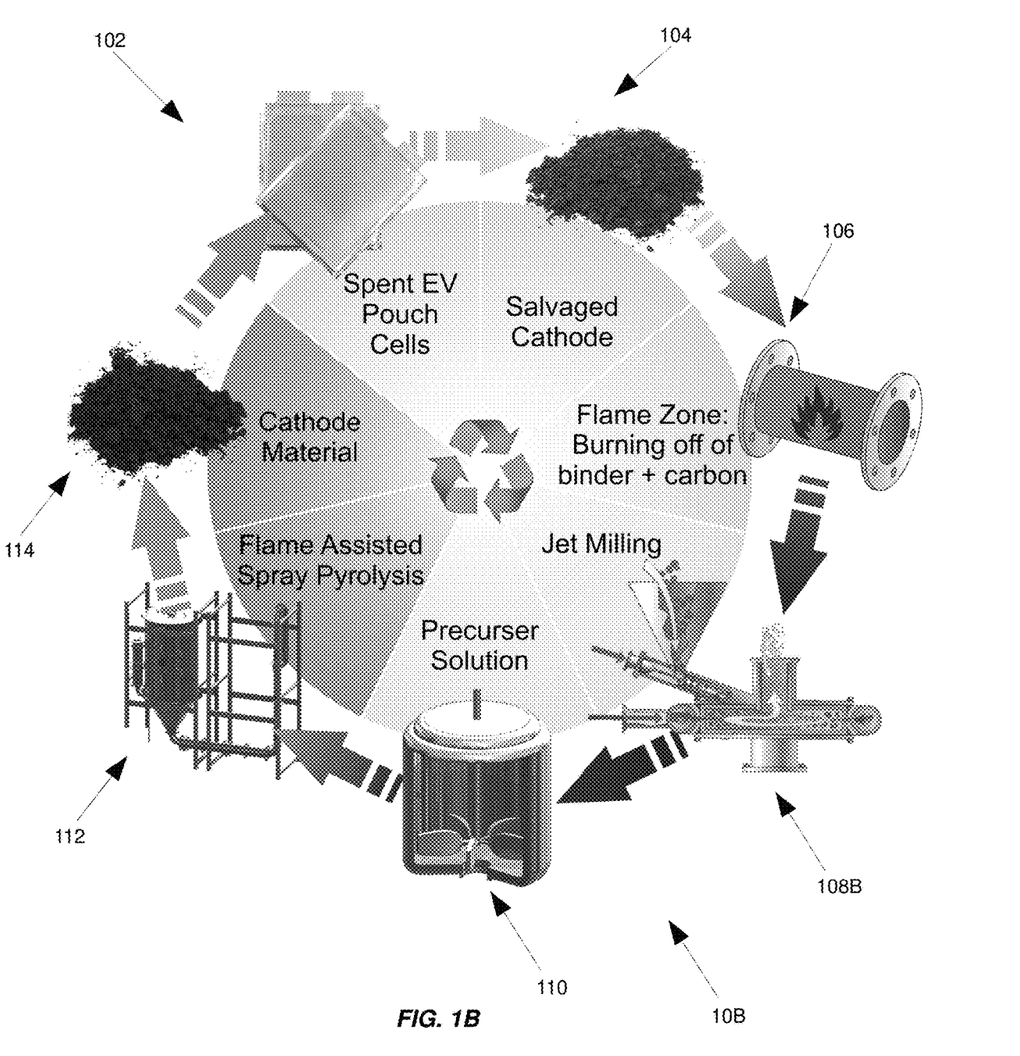

Turning to FIGS. 1A and 1B, process diagram for two illustrative embodiments of a closed loop recycling processes 10A and 10B in accordance with the principles of the present disclosure. Like elements in the two depicted processes are indicated using the same reference numerals.

Beginning with spent EV pouch cells 102, the used cathode layers are collected and separated. The cathode laminate may then be ground to a powdered form as salvage cathode 104. The salvaged cathode may then be treated to remove contaminants by sifting the powders into a hot stream of air which heats the powders, burning off contaminants including binder and carbon as shown in flame zone 106. The resulting particles may then be cooled and collected As depicted in FIG. 1A, in some embodiments, after particle collection the powders may be dispersed into leaching solution which works to dissolve metal oxides to create an acidic metal solution, as indicated by the acid etching step 108A. The acidic metal solution may then be mixed with a suitable solvent and additional metal acetates to create a final precursor solution. Suitable solvents may include glycerol. ethanol, isopropanol, water, or other alcohols. It will be appreciated that any solvent that may be used to retain the dissolved components in solution or suspension, as by hydrogen bonding, which is sufficiently evaporateable in the subsequent steps discussed further herein may be used.

As depicted in FIG. 1B, in some other embodiments, after particle collection the powders may be directed to a jet-mill, as indicated at 108B. The jet mill grinds the spent secondary cathode powder into nano-sized primary particles which may then be collected and re-dispersed in a lithium-containing glycerol solution to create a final precursor solution. It will be appreciated that in some embodiments, the jet-mill may actually be a series of jet-mills or other types of mills acting in stages to grind and/or coat the powder in stages. In some such embodiments, the particles may be mixed and/or coated with cathode precursors at different stages of jet-milling, which can allow "upcycling" of the materials. The jet mill(s) may operate in a continuous manner. Once jet-milling is complete, the produced nano-particles may then be collected and re-dispersed in a glycerol solution to create a final precursor solution. It will be appreciated that in some embodiments, additional metal acetate may be added to the precursor solution to adjust the stoichiometry of the cathode material. It will be appreciated that in additional to jet-mills, any mill that can provide adequate grinding and mixing at a suitable speed may be used.

It will be further appreciated that where the collected large size particles may be jet milled to produce nanosized particles which are then dispersed into a vat where it mixes with a suitable solvent, such as glycerol and additional metal acetates to adjust the desired stoichiometry to create a final glycerolate precursor may result in the formation of a homogeneous suspension for efficient spray pyrolysis. This formation of glycerolate precursors and nanosized NMC particles significantly reduces the lithiation/annealing time of post-spray pyrolysis. As discussed previously herein, suitable solvents may include glycerol. ethanol, isopropanol, water, or other alcohols. It will be appreciated that any solvent that may be used to retain the dissolved components in solution or suspension, as by hydrogen bonding, which is sufficiently evaporateable in the subsequent steps discussed further herein may be used The final precursor solution may then undergo spray pyrolysis by being pumped into the spray chamber along with compressed air, where it is dried and calcinated, as indicated at 112. This creates a final recycled cathode material 114 with high consistency and repeatability, which may then be used for suitable purposes, including in EV pouch cells for battery assemblies.

Figure 2A:
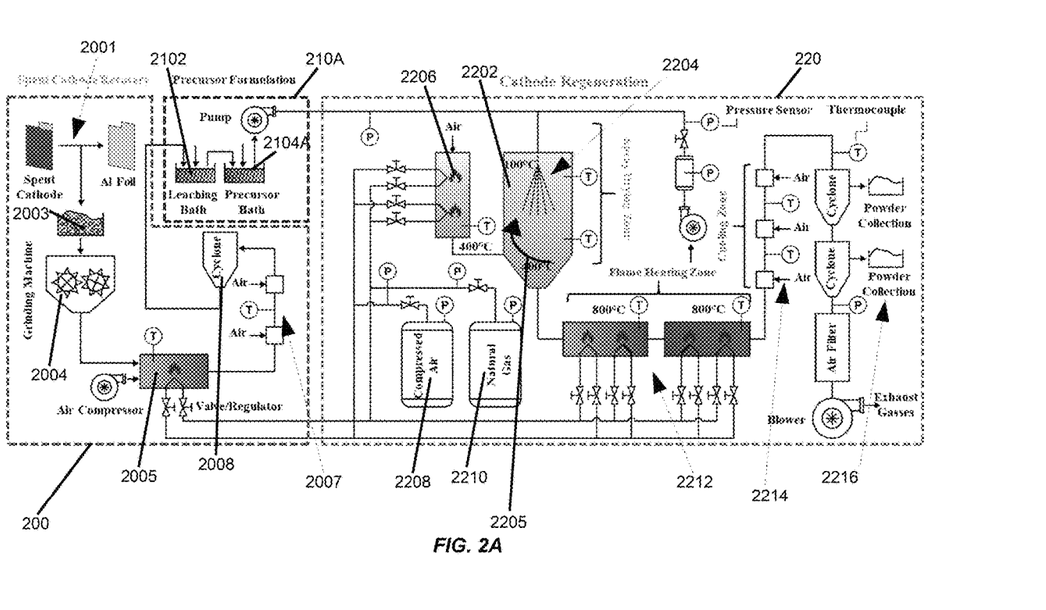
FIGS. 2A, 2B, and 2C are process diagrams providing overview of some illustrative cathode recycling system for conducting processes in accordance with the principles of the present disclosure
Figure 2B:
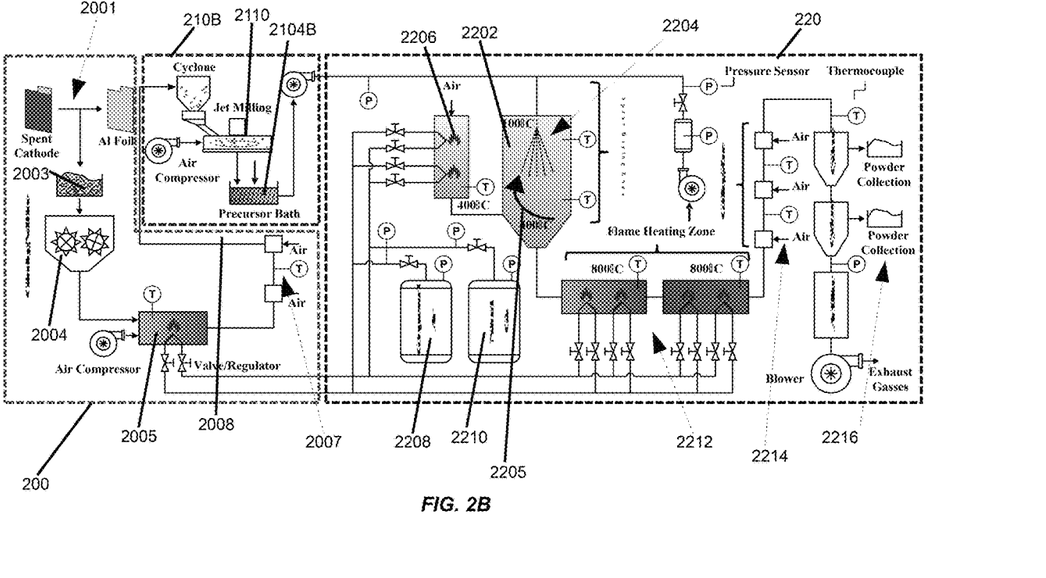
Figure 2C:
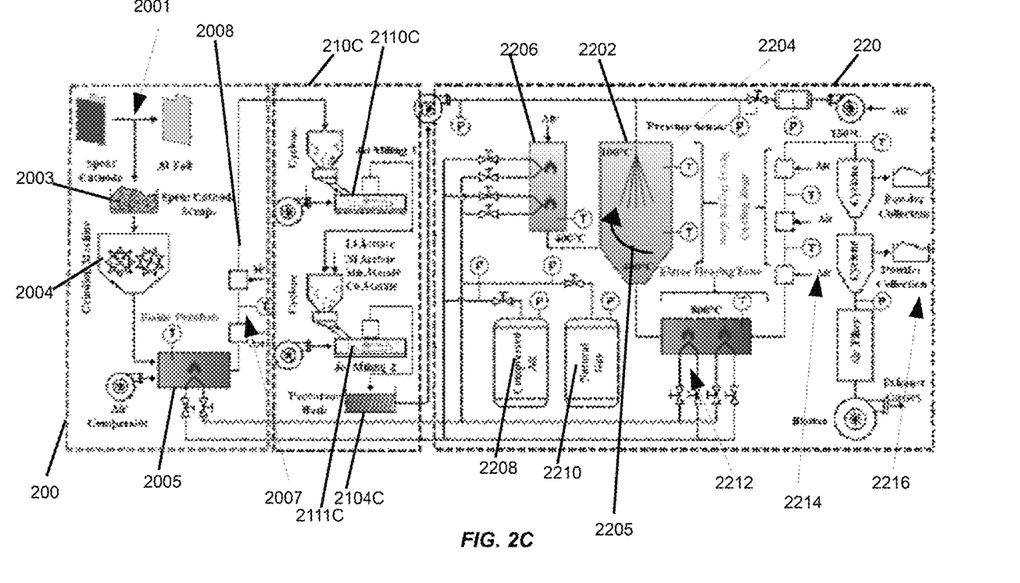
Figure 2D:
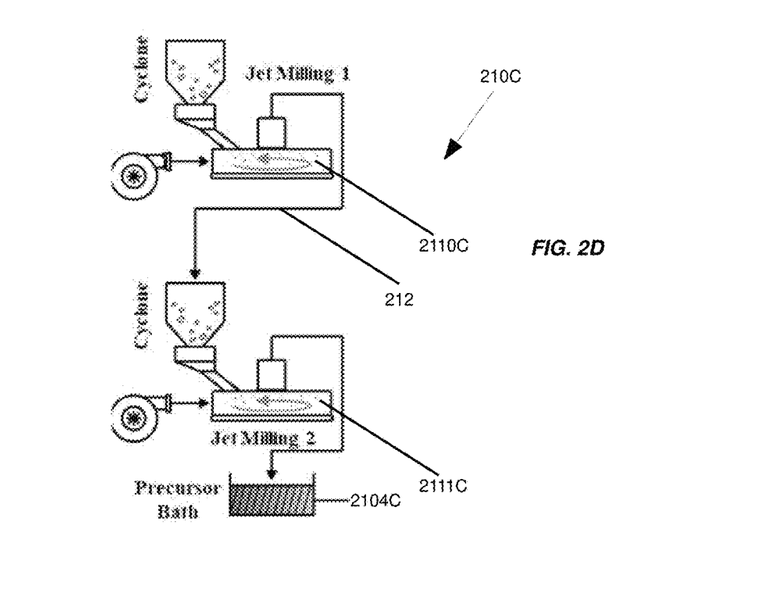
FIG. 2D depicts a portion of the process diagram of FIG. 2C in more detail.
Figure 3:
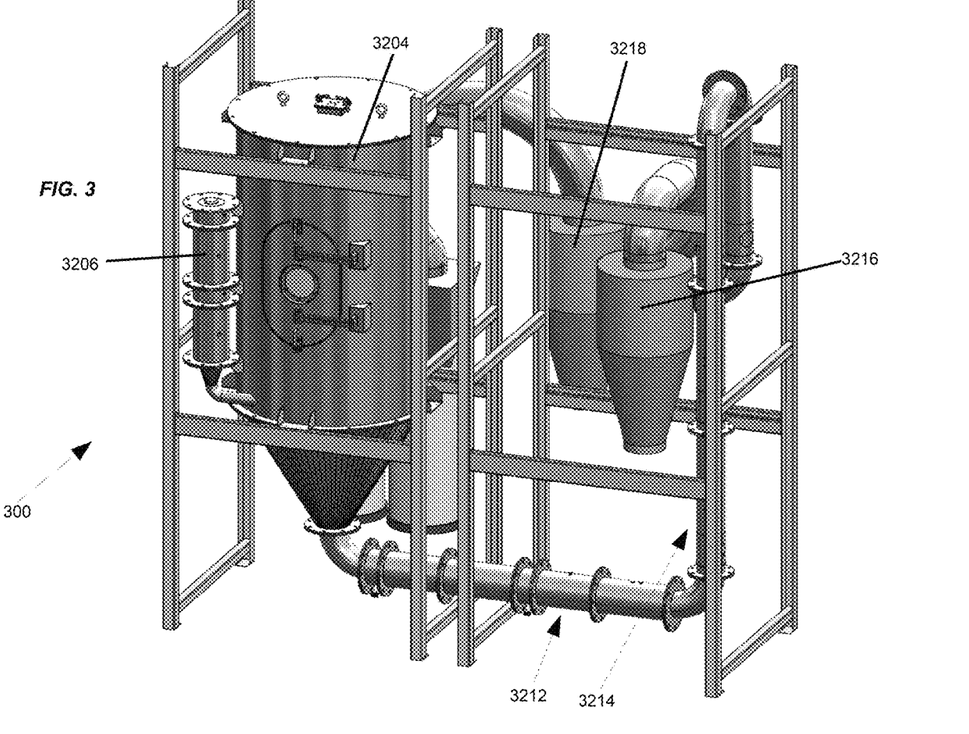
FIG. 3 depicts on illustrative arrangement of components for a cathode regeneration system that may be used with the systems of FIGS. 2A, 2B, and 2C in a continuous processing line.
Figure 4A:
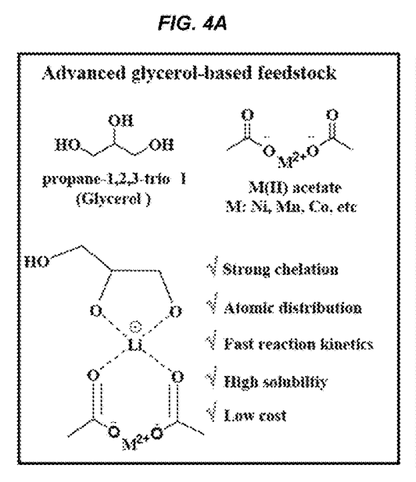
FIGS. 4A and 4B depict some illustrative chemical structures for the glycerol-based feedstocks for the precursor solutions useful in the processes in accordance with FIGS. 2A and 2B.
Figure 4B:
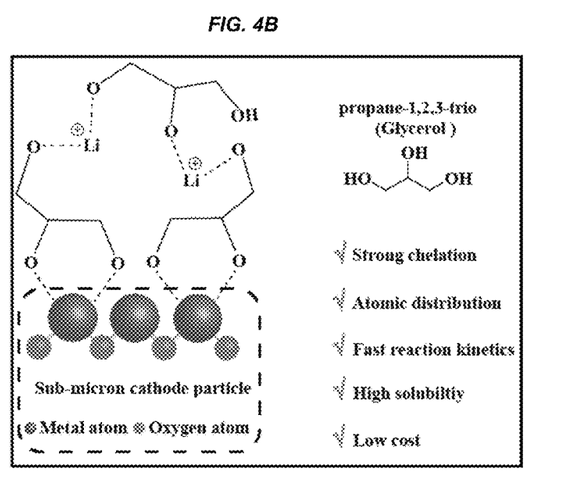

Turning to FIGS. 2A, 2B, and 2C, these respectively depict a process diagrams providing overviews of some illustrative cathode recycling systems for conducting processes in accordance with the principles of the present disclosure. FIG. 2D depicts a portion of the process diagram of FIG. 2C in more detail and FIG. 3 depicts one illustrative arrangement of components for a cathode regeneration system for a continuous processing line for conducting this process. It will be appreciated that other potential components and arrangements may be used in different embodiments as may be advantageous for particular installations and facilities or for the processing of particular used cathode materials. Some illustrative embodiments of processes in accordance with the principles of the present disclosure will be discussed with reference to these Figures for clarity, but is non-limiting, and is for the purpose of understanding processes in accordance with this disclosure. Other arrangements and variations for particular applications may be used. For clarity, common elements will be indicated with like reference numerals.

Spent Cathode Powder Recovery

In spent powder recovery, generally indicated at 200 begins with used cathode material, as collected from battery assemblies. As depicted at 2001, the cathode layer is first separated from the current collector. It will be appreciated that in the current collectors separated from the cathode laminate may include aluminum, copper, stainless steel, nickel, titanium, and other appropriate materials. The separation may be mechanical or chemical or both and such collected current collectors may be recycled using other appropriate methods.

Some exemplary spent cathode materials may include lithium metal oxides (LiMO, M=Ni, Mn, Co, Al, Ti, Cu, Sn, Nb, W, Sb, Fe, Mg, any 3d-5d metals, and/or various combinations thereof), where lithium-based battery cathode materials are recycled. Where other alkali metal cathode materials are being treated, the spent cathode materials may include other alkali metal oxides. It will be appreciated that any transition metal used in cathodes may be recovered though the processes in accordance with the present disclosure, but for clarity in explanation, lithium is used as an exemplary metal in the discussed embodiments.

The collected cathode laminate 2003 is the pulverized, as by feeding into a hopper which continuously feeds into a grinding device 2004, to pulverize the cathode into a powdered form. At this point, the ground powder of the recycled cathodes still contains many contaminants which may include carbon/graphite, various polymeric binders, and low levels of solvents. These contaminants must be burned off in order to recover pure oxide NMC cathode. This treatment may be performed by sifting the powders into a hot stream of air, as indicated at 2005. The hot stream of air may be contained in stainless steel piping, similar to the hot zones used in the spray pyrolysis chamber as discussed further herein. A suitable heat source, such as a large natural gas burner may be used to heat the air stream, which in turn heats the powders, burning off all contaminants left in the materials. The product is then cooled as indicated at 2007, where cool air is introduced to the stream of hot gases to cool the products. The cooled products may then be collected, as by routing through a cyclone 2008 where the particles are collected.

The carbonaceous material that are burnt off may include: graphite, carbon black, hard carbon, flake graphite, etc. The burn-off conditions for particular carbonaceous materials may require varying temperature, duration, fuel source, and chamber pressure, which can be controlled for particular applications.

Precursor Formulation

In FIG. 2A, leachate precursor formulation, generally indicated at 210A, follows the spent cathode recovery. After particle collection, the collected powders are dispersed into leaching solution, where it may be continuously mixed via mechanical stirrers. The leaching bath 2102 works to dissolve metal oxides, leaving bare metal powders. Exemplary leaching solutions may be acidic use water solvent solutions, including acetate acid, sulfuric acid, hydrochloride acid, alkaline: sodium hydroxide, lithium hydroxide, potassium hydroxide, other suitable acids and mixtures of suitable acids. The concentration is from 0-10 M, pH from 0-12. The ratio among Li, M and proton (or hydroxide) can vary depending on the particular materials processed and the quality of the final product. The acidic metal solution is then continuously fed from the leaching bath into precursor bath 2104A where it mixes with a suitable solvent, such as glycerol and additional metal acetates, to creating the final precursor solution which is ready for spray pyrolysis.

In FIG. 2B, continuous precursor formulation, generally indicated at 210B, follows the spent cathode recovery. After particle collection, the powders are be directed to a jet mill 2110. As depicted, a cyclone collector may be used for particle collection although it will be appreciated that this can vary based on the particular installation and that other appropriate collectors may be used in other embodiments.

As the recovered cathode powder is continuously blown into the jet mill 2110, the micron-sized secondary particles collide with each other and break down into nano-sized primary particles at high speed under compressed air. The nano-sized particles may then be fed and dispersed into the precursor bath 2104B under mechanical stirring to form a homogeneous solution. The precursor bath may contain lithium hydroxide (LiOH) as the lithium compensation precursor and glycerol as the chelating agent. The molar concentration of LiOH depends on the lithium deficiency in the spent cathode materials. For example, if the spent NMC has a stoichiometry of $Li_{0.5}Ni_{0.6}Mn_{0.2}Co_{0.2}O_2$, the molar ratio between LiOH to NMC would be 0.55:1 in order to produce a full stoichiometry cathode of $Li_{1.05}Ni_{0.6}Mn_{0.2}Co_{0.2}O_2$. it will be appreciated that in some embodiments, Additional transition metal acetates may be added to the precursor solution to adjust the stoichiometry of the cathode material (e.g., adding Ni acetate, Mn acetate, Co acetate adjust the ratio of x, y, z in $LiNi_xMn_yCo_z$, where x+y+z=1).

It will be appreciated that the diameter of milling chamber, volume of the milling chamber, gas pressure, gas flow rate, particle feed rate, starting particle size, final particle size, chamber temperature, and milling time of the jet mill may be monitored and varied to achieve the desired particle size. Further, in addition to lithium hydroxide other potential lithium compensation precursors may include lithium carbonate, lithium acetate, Li sulfate, and lithium nitrate, among others. Where other alkaline metal cathodes are used, the precursor will be changed accordingly. Suitable solvents may include water, ethanol, isopropanol, glycerol or combination of thereof depending on the target viscosity. In a typical installation, this may occur at a temperature of from about 25° C. to about 80° C.

The nano-sized particles may then be fed and dispersed into the precursor bath 2104B under mechanical stirring to form a homogeneous solution. The precursor bath may contain lithium hydroxide (LiOH) as the lithium compensation precursor and a suitable solvent, such as glycerol, as the chelating agent. The molar concentration of LiOH depends on the lithium deficiency in the spent cathode materials. For example, if the spent NMC has a stoichiometry of $Li_{0.5}Ni_{0.6}Mn_{0.2}Co_{0.2}O_2$, the molar ratio between LiOH to NMC would be 0.55:1 in order to produce a full stoichiometry cathode of $Li_{1.05}Ni_{0.6}Mn_{0.2}Co_{0.2}O_2$. it will be appreciated that in some embodiments, Additional transition metal acetates may be added to the precursor solution to adjust the stoichiometry of the cathode material (e.g., adding Ni acetate, Mn acetate, Co acetate adjust the ratio of x, y, z in $LiNi_xMn_yCo_z$, where x+y+z=1).

It will be appreciated that the diameter of milling chamber, volume of the milling chamber, gas pressure, gas flow rate, particle feed rate, starting particle size, final particle size, chamber temperature, and milling time of the jet mill may be monitored and varied to achieve the desired particle size. It will be appreciated that in addition to jet mills any suitable mills, including roller mills, spinning mills, etc. may be used. Further, in addition to lithium hydroxide other potential lithium compensation precursors may include lithium carbonate, lithium acetate, Li sulfate, and lithium nitrate, among others. Where other alkaline metal cathodes are used, the precursor will be changed accordingly. Suitable solvents may include water, ethanol, isopropanol, glycerol or combination of thereof depending on the target viscosity. In a typical installation, this may occur at a temperature of from about 25° C. to about 80° C.

In FIGS. 2C and 2D, continuous precursor formulation using a series of jet-mills, generally indicated at 210C, follows the spent cathode recovery. After particle collection, the powders are to be directed to a first jet mill 2110C. As depicted, a cyclone collector may be used for particle collection although it will be appreciated that this can vary based on the particular installation and that other appropriate collectors may be used in other embodiments.

As the recovered cathode powder is continuously blown into the jet mill 2110, the micron-sized secondary particles collide with each other and break down into nano-sized primary particles at high speed under compressed air. The nano-sized particles may then be fed into a subsequent jet-mill 2111C, where the particles may be mixed and coated with additional cathode precursors for recycling or upcycling. Some suitable additional cathode precursors may include: lithium hydroxide, lithium carbonate, lithium acetate, Li sulfate, lithium nitrate. If other alkaline metal cathodes are used, these precursors will be changed accordingly; nickel nitrate, acetate, hydroxide, carbonate, sulfate, chloride; cobalt nitrate, acetate, hydroxide, carbonate, sulfate, chloride; manganese nitrate, acetate, hydroxide, carbonate, sulfate, chloride; aluminum nitrate, acetate, hydroxide, carbonate, sulfate, chloride; magnesium nitrate, acetate, hydroxide, carbonate, sulfate, chloride; niobium nitrate, acetate, hydroxide, carbonate, sulfate, chloride; tungsten nitrate, acetate, hydroxide, carbonate, sulfate, chloride; or other transition metal nitrate, acetate, hydroxide, carbonate, sulfate, chloride, and mixtures thereof.

It will be appreciated that although two jet-mills are depicted in FIGS. 2C and 2D, that in other embodiments different numbers of mills may be used to allow for the addition of different cathode precursors under different conditions or ensuring milling to a particular size.

The coated nano-sized particles may then be fed and dispersed into the precursor bath 2104C under mechanical stirring to form a homogeneous solution/suspension. The precursor bath contains solvents that can form a homogeneous solution of the coated cathode powders. The molar concentration of relithiation agent (e.g., LiOH) and upcycling agents (e.g. Ni, Mn, Al, Co acetate) depend the lithium deficiency in the spend cathode materials or target upcycled cathode performance (e.g. Ni content, capacity). For recycling, for example, if the spent NMC has a stoichiometry of $Li_{0.5}Ni_{0.6}Mn_{0.2}Co_{0.2}O_2$, the molar ratio between LiOH to NMC may be 0.55:1 in order to produce a full stoichiometry cathode of $Li_{1.05}Ni_{0.6}Mn_{0.2}Co_{0.2}O_2$. For upcycling, for example, if the target composition is $Li_{1.05}Ni_{0.7}Mn_{0.1}Co_{0.2}Al_{0.03}$, a corresponding molar ratio of the Li, Ni, Mn, Co, Al precursors should be added to the adjust the stoichiometry of the spent cathode with lower Ni content (i.e., Ni<0.7).

Additional transition metal acetates may be added to the precursor solution to adjust the stoichiometry of the cathode material (e.g., adding Ni acetate, Mn acetate, Co acetate adjust the ratio of x, y, z in $LiNi_xMn_yCo_z$, where x+y+z=1).

It will be appreciated that the diameter of milling chamber, volume of the milling chamber, gas pressure, gas flow rate, particle feed rate, starting particle size, final particle size, chamber temperature, and milling time of the jet mill may be monitored and varied to achieve the desired particle size and desired coating thickness. Further, in addition to lithium hydroxide other potential lithium compensation precursors may include lithium hydroxide, lithium carbonate, lithium acetate, Li sulfate, lithium nitrate, among others. Where other alkaline metal cathodes are used, the precursor will be changed accordingly. Suitable solvents may include water, ethanol, glycerol, isopropanol, or combinations of thereof depending on the target viscosity. In a typical installation, this may occur at a temperature of from about 25° C. to about 80° C.

A precursor solution created using processes in accordance with the present disclosure, including those depicted in FIGS. 2A through 2D, may include water, ethanol, glycerol, isopropanol or combination thereof. The metal acetates may include cathode precursors: lithium metal oxides (LiMO, M=Ni, Mn, Co, Al, Ti, Cu, Sn, Nb, W, Sb, Fe, Mg, any 3d-5d metals, and/or various combinations thereof).

The molar ratio of metal and glycerol can vary from 0-0.5. Viscosity also depends on the concentration of metal in glycerol. The compensation of extra cathode precursors is used to achieve the designed cathode stoichiometry (e.g., to produce $Li_{1.05}Ni_{0.6}Mn_{0.2}Co_{0.2}O_2$, the concentration of $Li^+$, $Ni^{2+}$, $Mn^{2+}$, $Co^{2+}$, in the precursor solution has to be 1.05M, 0.6M, 0.2M, 0.2M, respectively. The concentration will be monitored, as by using as in-situ ICP (inductive coupled plasma) device and can be adjusted as required to produce suitable precursor solution.

Cathode Regeneration from Precursor Solution.

Cathode direct synthesis, generally indicated at 220, may then be performed on the final precursor solution. As indicated at 2202, this solution may be pumped into the spray chamber along with compressed air, where it is dried, creating micron-sized spherical cathode precursor particles. This may take place using Flame-Assisted Spray Pyrolysis Technology (FAST). In one illustrative embodiment, this may be performed in a spray chamber 2204, which may be similar to that depicted at 3204 in FIG. 3.

As indicated at 2202, the precursor solution composing dry salt particles (in the case of leaching solution) or dry salt/metal oxide particles (in the case of jet-milling) in solvent may be continuously injected at the top of a large spray chamber. The delivery pressure of the air and precursor solution at the inlet to the spray chamber can be changed to alter the droplet size of the atomized solution, effecting the overall particle size of the final product. A stream of hot air may be simultaneously in a separate heating chamber 22006 (3206 in FIG. 3) and introduced to the system at the bottom of the spray chamber. A heat gradient is observed from the bottom of the spray chamber to the top, as the inlet air spirals vertically upward around the walls. Micro-droplets of the precursor solution mix with the hot air at the inlet and reduce in size as excess solvent is evaporated, resulting in a dry salt particle.

It will be appreciated that the stream of hot air may be heated to a suitable temperature for performing the required drying. In the depicted embodiment, the air may be heated to around 400° C. in the separate heating chamber prior to introduction at the bottom of the drying chamber. As depicted, the separate heating chamber may receive fuel, such as natural gas and air from suitable sources, such as pressurized tanks 2208 and 2210 to allow the temperature to be controlled and varied as needed. It will be appreciated that the drying conditions including duration, temperature, and spray chamber pressure may be varied based on the input to achieve the desired drying. Additionally, parameters of the precursor solution introduction including flow rate, spray nozzle diameter (droplet size), chamber pressure, and chamber temperature may similarly be varied to achieve the desired dry salt particle size.

When treating precursor solution formed following leaching, the drying process discussed herein achieves solvent, such as glycerol, evaporation and salt precipitation to produce dried salt particle. When treating precursor solution formed following jet-milling, the drying process achieves solvent, such as glycerol, evaporation and salt precipitation to produce dried salt/metal oxide particles.

Flame-Assisted Heating Zone

The dried particles produced in the spray drying zone are directed to the bottom of the drying chamber, generally indicated as the Flame-Assisted Heating Zone 2212. As indicated at 3212 in FIG. 3, this zone may be constructed as a series of hotter pipes. This direction may take place via continuous air flow from the drying chamber through the flame assisted heating zone.

In the depicted embodiments, internal oxygen-methane torches increase the temperature, and the particles pass therethrough with sufficient residence time in this second-stage heating zone to achieve final well calcined materials. The various parameters of the heating may be controlled to obtain the desired final products. For example, heat introduced by the torches along the length of the airstream can be adjusted to either reflect changes in air flow, or to increase or decrease the temperature at each hot section. Regulation of the fuel and oxygen ratios, pressures, and flow rates will ultimately determine the amount of heat that is put into the system. Modular increases to the length of the flame-heating zone may also optimize the dwell time to enable the continuous production product with the desired crystal phase. In the depicted embodiment, the temperature can be adjusted from about 600° C. to about 1000° C., and a typical processing temperature may be about 800° C.

Figure 5A:
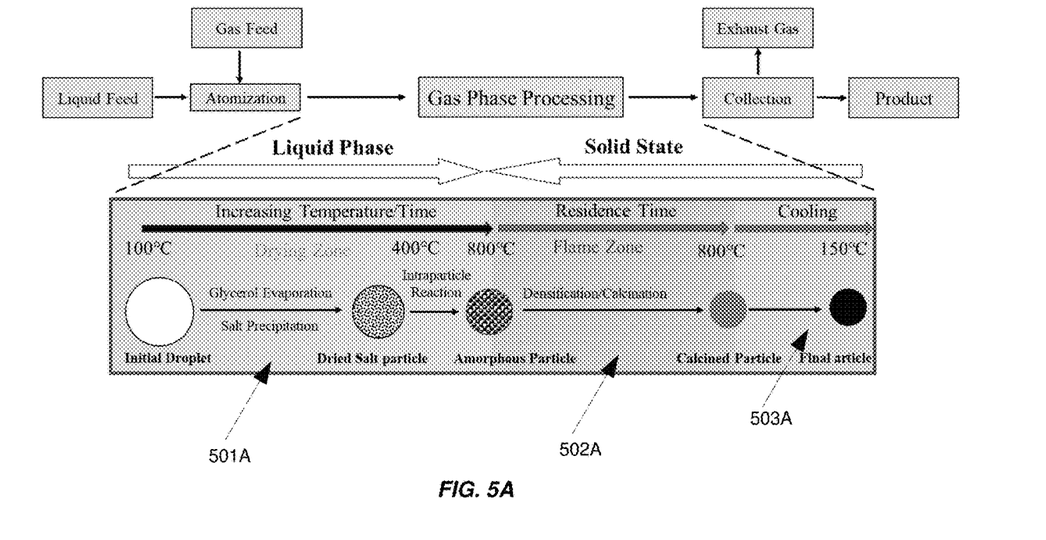
FIGS. 5A and 5B are process diagrams depicting stages of cathode material undergoing the spray pyrolysis processes depicted in FIGS. 2A and 2B
Figure 5B:
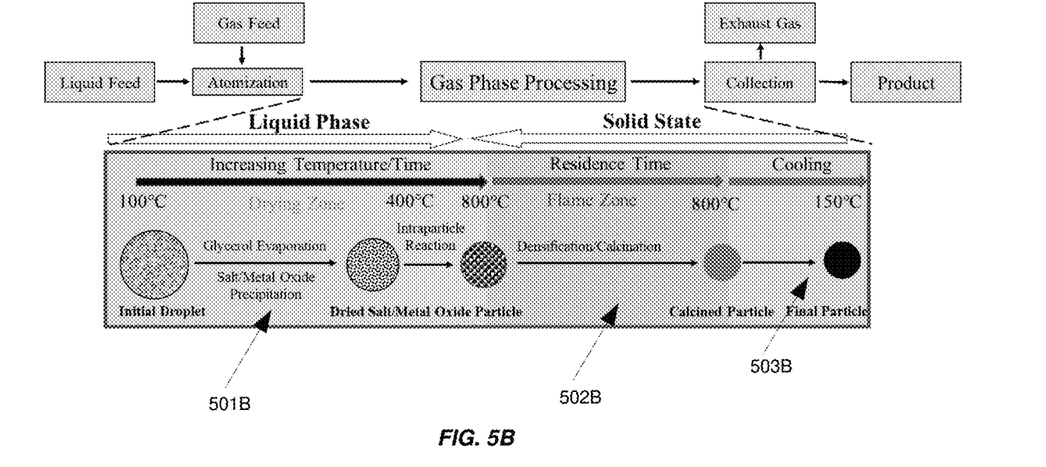

As indicated at 502A in FIG. 5A and 502B in FIG. 5B, the flame zone process performs densification/calcination on the dried salt particles or dried salt/metal oxide particles to produce calcined particles.

Cooling Zone

Once the product particles have calcined to the desired crystal structure in the Flame-Heating Zone, the products are passed into a cooling zone, generally indicated at 2214. As indicated at 3214 in FIG. 3, this cooling zone be constructed as a continuation of the series of pipes. This direction of particles may take place via continuous air flow from the flame assisted heating zone to the cooling zone. In the depicted embodiment, cool air enters the system through inlet vents positioned around cooling pipes immediately downstream of the flame-heating zone, cooling the airstream. In one embodiment, the airstream may be cooled to room temperature. It will be appreciated that the flow rate, chamber pressure, chamber temperature may all be monitored, varied and controlled to obtain the desired final product. As indicated at 503A in FIG. 5A and 503B in FIG. 5B, the cooling zone process produced a suitable final article from the calcined particle.

Following the cooling zone, the particle collection takes place, as indicated at 2216. In the depicted embodiment, this collection may be performed by a series of cyclone collectors and filters to collect a high percentage of the particulates before exhausting clean air to the environment. As depicted in FIG. 3, there may be two cyclone collectors 3216 and 3218, although it will be appreciated that this can vary based on the particular installation and that other appropriate collectors may be used in other embodiments.

Figure 6:
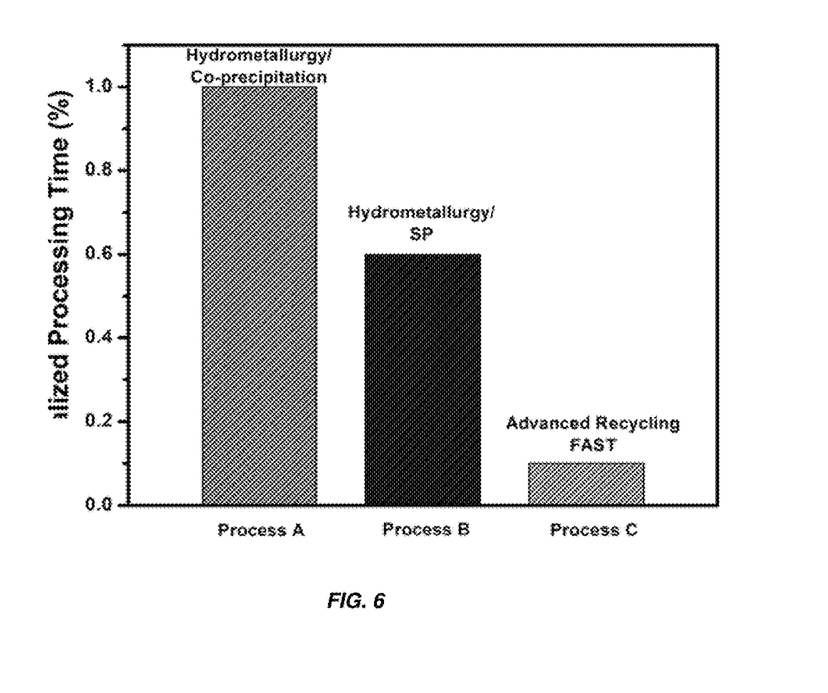
FIG. 6 is a chart depicting a comparison of the processing times for the process in accordance with FIG. 2A and/or FIG. 2B to that of current cathode recycling processes.

Processes in accordance with the present disclosure may be able to provide advantages over the current cathode recycling procedures, including the substantial reduction of processing time and required energy. FIG. 6 is a comparison of the normalized processing time required for hydrometallurgy with co-precipitation (Process A), hydrometallurgy SP (Process B), and a FAST recycling process in accordance with the present disclosure, showing processes in accordance with the present disclosure may be up to 90% faster than current processes. Additionally, they may produce a higher quality regenerated cathode material that is post-calcination free and ready for use with minimal or no further processing. Such processes may be easily scalable and more environmentally friendly than the current processes as well.

Element Recovery Via Electrochemical Process

Processes in accordance with the present disclosure also allow for the recovery of metal elements, in addition to the recycling and/or upcycling of cathode materials. In such processes, the spent cathode powder recovery may be performed as discussed previously herein in connection with FIGS. 2A through 2C, in order to recover pure oxide NMC cathode. This may include the collection, separation, grinding and heat treatment to burn off contaminants from the materials left in the materials, followed by cooling and collection.

Leachate Precursor Formulation:

After particle collection, the powders may be dispersed into a vat of leaching solution where it is continuously mixed via mechanical stirrers. The leaching solution may use water as a solvent. Depending on the particular materials to be dissolved, it may be an acidic solution (e.g., acetate acid, sulfuric acid, hydrochloride acid, etc.), or an alkaline solution (e.g., sodium hydroxide, lithium hydroxide, potassium hydroxide, etc.). It will be appreciated that solutions having a wide range of concentration (from 0-10 M) and pH (from 0-12) may be used so long as the solution will function to dissolve metal oxides to form a solution for elective electrochemical deposition of metal salts from the collected powder, which may include lithium metal oxides (LiMO, M=Ni, Mn, Co, Al, Ti, Cu, Sn, Nb, W, Sb, Fe, Mg, and any 3d-5d metals).

Selective Electrodeposition

The leachate solvent is then mixed with an alkaline solution to form a suitable electrolyte for electrochemical deposition of target metal salts. Suitable metal salt solutions may be alkaline metal based salt solutions, including lithium nitrate, acetate, hydroxide, carbonate, sulfate, chloride; or other alkaline metal salts which are dissolved in water, ethanol, isopropanol or other suitable solvents. It will be appreciated that solutions having a wide range of concentration (from 0-10 M) and pH (from 0-12) may be used so long as the solution will function as an electrolyte to allow electrodeposition of the metal salt therefrom.

The electrolyte may undergo an electrode deposition process where two electrodes with different polarities are used to collect the metal salt of interest from the electrolyte. Suitable electrodeposition equipment and current that are compatible with the electrolyte and metal of interest may be used. The produced metal salt product may be: nickel nitrate, acetate, hydroxide, carbonate, sulfate, chloride; cobalt nitrate, acetate, hydroxide, carbonate, sulfate, chloride; manganese nitrate, acetate, hydroxide, carbonate, sulfate, chloride; aluminum nitrate, acetate, hydroxide, carbonate, sulfate, chloride; magnesium nitrate, acetate, hydroxide, carbonate, sulfate, chloride; niobium nitrate, acetate, hydroxide, carbonate, sulfate, chloride; tungsten nitrate, acetate, hydroxide, carbonate, sulfate, chloride; or other transition metal nitrate, acetate, hydroxide, carbonate, sulfate, chloride. It will be appreciated that the particular solvent and powders selected allow the desired metal to be recovered.

EXPERIMENTAL EXAMPLES

Cathode Powder Preparation

Example 1: Spent Cathode Powder

Cathode laminate was retrieved from a spent battery, and then separated from the Al current collector. The carbon and polymer contaminate within the cathode laminate were burned off by passing the laminate through a heated environment at temperature of 400° C. for 1-30 minutes. The heat-treated powder was then cooled down to room temperature and collected for electrode preparation.

Figure 7A:
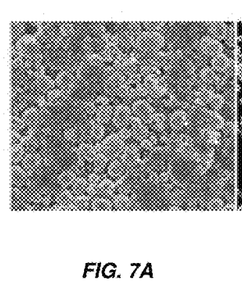
FIGS. 7A, 7B, and 7C are SEM images of spent cathode, separated spent cathode powder and recovered spent cathode powder after heat treatment
Figure 7B:
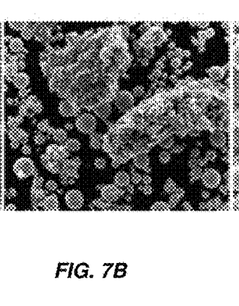
Figure 7C:
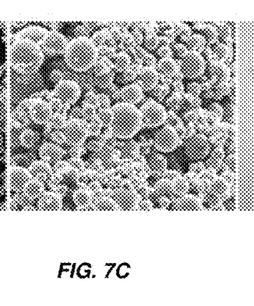
Figure 7D:
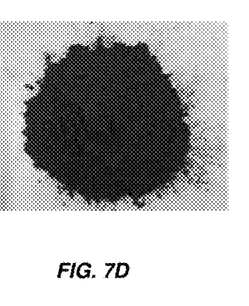
FIG. 7D is a photograph of recovered spent cathode powder after heat treatment.

Scanning electron microscopy (SEM) samples were prepared by placing the collected cathode powders on a conductive stage. SEM images were taken with a JOEL JCM-7000. FIGS. 7A, 7B, and 7C are SEM images of spent cathode, separated spent cathode powder and recovered spent cathode powder after heat treatment, respectively, from Example 1. FIG. 7D is a photograph of recovered spent cathode powder after heat treatment. These images demonstrate the efficiency of heat treatment to burn off contaminates from the cathode materials.

Example 2: Recycled Cathode Powder

Cathode laminate was retrieved from a spent battery, and then separated from the Al current collector. The carbon and polymer contaminate within the cathode laminate were burned off by passing the laminate through a heated environment at temperature of 400° C. for 1-30 minutes. The heat-treated powder was then cooled down and fed into a jet mill to mix with Li-acetate. The uniform powder mixture was then dispersed in a precursor bath under stirring and introduced to a spray drying system. The spray system had an air nozzle pressure of 30 psi and precursor flow rate of 114 ml/min. The air entering the drying chamber had a temperature of 400° C. via natural gas burners and was introduced to the system at the bottom of the drying chamber. Micro-droplets of the precursor solution mixed with the hot air at the inlet and reduced in size as excess solvent was evaporated, resulting in dry particles coated with relithiation agent. The particles were then calcined for different times (1 minutes-10-hours) in the flame-assisted heating zone at temperature of 650° C., and then cooled down to room temperature and collected for electrode preparation.

Figure 8A:
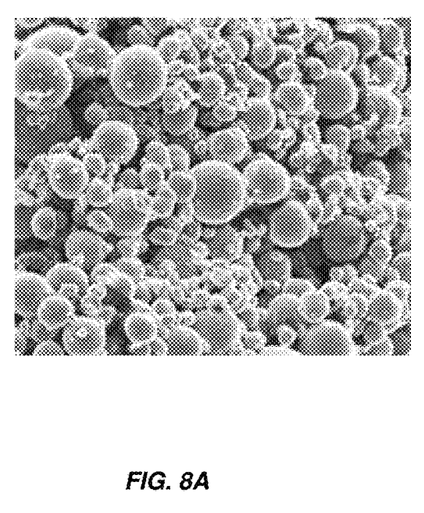
FIGS. 8A and 8B, respectively, are SEM images of secondary particles and primary particles after jet-milling of spent cathode powder.
Figure 8B:
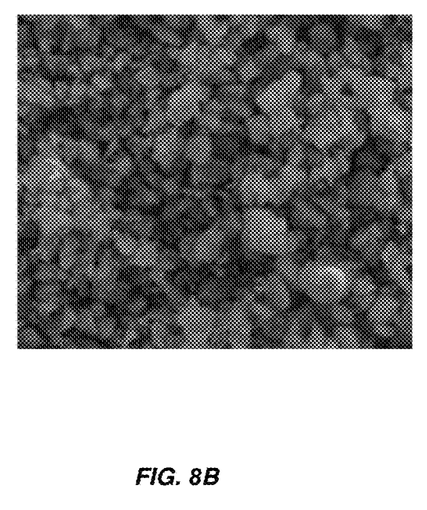

Scanning electron microscopy (SEM) samples were prepared by placing the collected cathode powders on a conductive stage. SEM images were taken with a JOEL JCM-7000. FIGS. 8A and 8B, respectively, are SEM images of secondary particles and primary particles after jet-milling of spent cathode powder. These demonstrate the efficiency of jet-milling to breakdown the secondary particles into primary particles with size in range of nm.

Raman samples were prepared by placing collected cathode powder in a sample holder. Raman spectra were acquired with a confocal optical microscope (WiTec AlphaSNOM™) using a solid-state 532 nm excitation laser, a 20× objective, and a 600 grooves per millimeter grating. The laser spot size is approximately 1 µm. Acquisition times for each spectrum ranged from 30 s to 3 min.

Figure 9A:
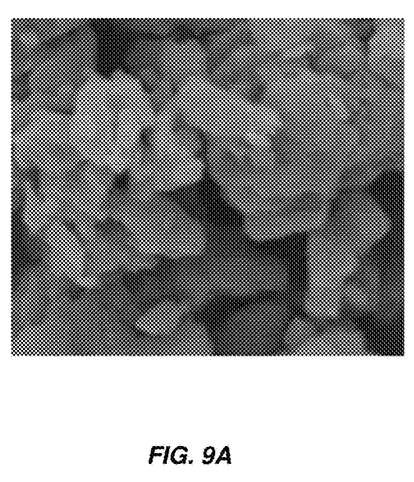
FIG. 9A is an SEM image of primary particles coated with relithiation agent.
Figure 9B:
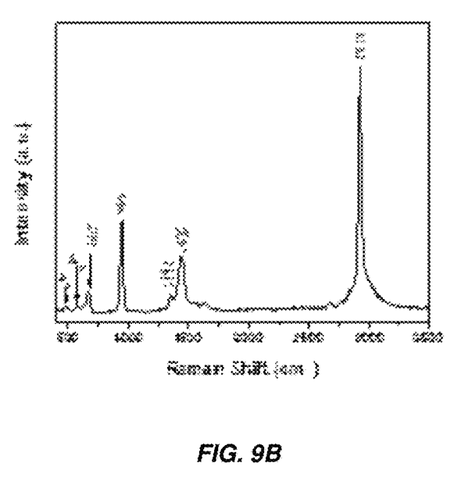
FIG. 9B is a graph of the Raman spectra confirming successful coating of relithiation agent.

FIG. 9A is an SEM image of primary particles coated with relithiation agent and FIG. 9B is a graph of the Raman spectra confirming successful coating of relithiation agent. These demonstrate the efficiency of jet-milling to breakdown the secondary particles into primary particles with size in range of nm and achieve uniform cathode coating.

Figure 10A:
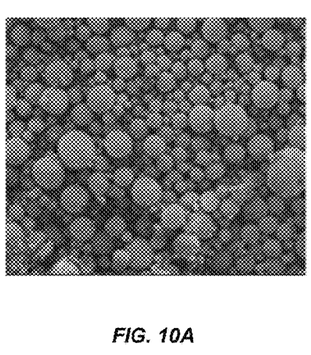
FIGS. 10A, 10B and 10C are SEM images of recycled secondary cathode particles taken at different magnifications, specifically 500×, 1000× and 4000×.
Figure 10B:
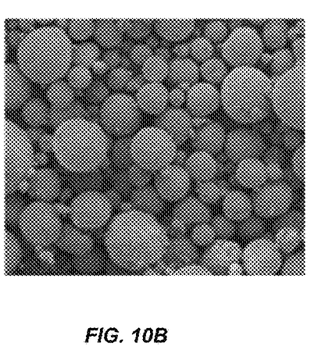
Figure 10C:
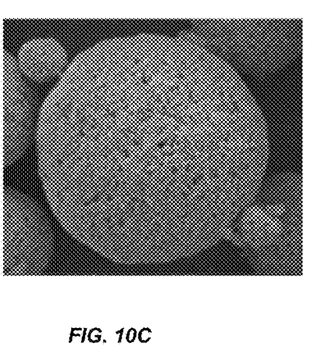

FIGS. 10A, 10B and 10C are SEM images of recycled secondary cathode particles taken at different magnifications specifically 500×, 1000× and 4000×. These demonstrate that the recycled particles have the desired size (>10 um) and shape (spherical).

Figure 11A:
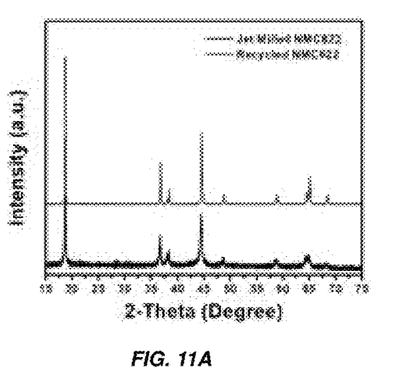
FIG. 11A is a comparison of the XRD spectra of jet milled and recycled cathode and FIG. 11B is a comparison of size distribution of jet milled and recycled cathode.

X-ray diffraction (XRD) samples were prepared by placing collected cathode powder in a sample holder. Scanning was performed on a Bruker D8 with Cu Kα radiation operated at 40 kV and 15 mA. A comparison of the XRD spectra of jet milled and recycled cathode is depicted in FIG. 11A, which demonstrates that the cathode structure is restored after recycling.

Figure 11B:
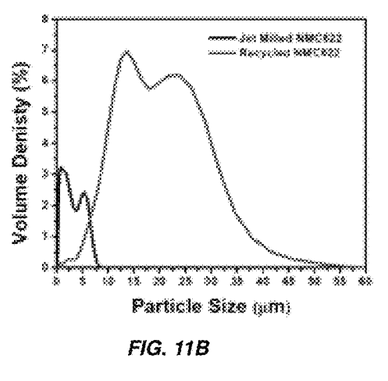

Cathode size distribution was conducted on multi-frequency laser diffraction analyzer (Beckman Coulter LS230). Samples were prepared by dispersing 50 mg of cathode powder in 1 ml IPA. The dispersion of each sample was added dropwise into the instrument. The size distribution is an average of three acquisitions. A comparison of size distribution of jet milled and recycled cathode is depicted in FIG. 11B and shows that the spray pyrolysis process has successfully increased the size of recycled particles by forming secondary particles with high tap density, which are beneficial for electrode processing.

Example 3: Upcycled Cathode Powder

Cathode laminate was retrieved from a spent battery, and then separated from the Al current collector. The carbon and polymer contaminate within the cathode laminate were burned off by passing the laminate through a heated environment at temperature of 400° C. for 1-30 minutes. The heat-treated powder was then cooled down naturally and fed into a first jet mill to break down the particle size, then a second jet-mill to mix with Li-acetate, Ni-acetate, Co-acetate, and Al-acetate. The uniform powder mixture was then dispersed in a precursor bath under stirring and introduced to a spray drying system. The spray system had an air nozzle pressure of 30 psi and precursor flow rate of 114 ml/min. The air entering the drying chamber had a temperature of 400° C. via natural gas burners and was introduced to the system at the bottom of the drying chamber. Microdroplets of the precursor solution mixed with the hot air at the inlet and reduced in size as excess solvent is evaporated, resulting in dry particles coated with upcycling agents. The particles were then calcined for different durations (1 minutes-10-hours) in the flame-assisted heating zone at temperature of 650° C., and then cooled down to room temperature and collected for electrode preparation.

Figure 12A:
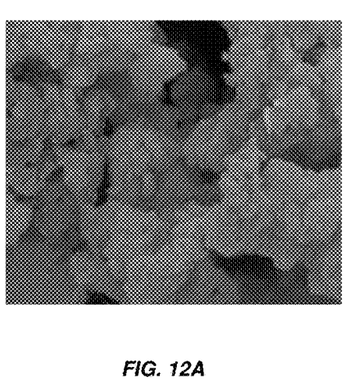
FIG. 12A is an SEM image of primary particles coated with upcycling agents before calcination and FIG. 12B is an SEM image of primary particles coated with upcycling agent after calcination.
Figure 12B:
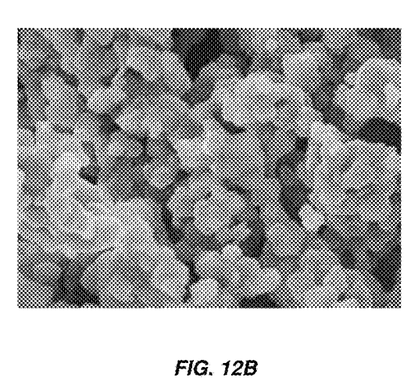

Scanning electron microscopy (SEM) samples were prepared by placing the collected cathode powders on a conductive stage. SEM images were taken with a JOEL JCM-7000. FIG. 12A is an SEM image of primary particles coated with upcycling agents before calcination and FIG. 12B is an SEM image of primary particles coated with upcycling agent after calcination. These images show that the uniform coating upcycling agent occurred after the second jet-milling, and the smooth surface depicted after calcination indicates a successful upcycling of the materials.

Example 4: Determination of Metal Concentrations in Aqueous Solutions

To determine the stoichiometry of cathode, samples of cathode powder were digested in freshly prepared in acid solution (3:1 v/v mixture of 37% v/v HCl and 70% v/v HNO3) and diluted in ultrapure water. Inductively Coupled Plasma Mass Spectrometry (ICP-MS) was conducted on an Agilent 8900 ICP-QQQ to determine metal concentrations in the resulting aqueous solutions. The table below shows the cathode stoichiometry at pristine, spent and recycled states.

|  | Li | Ni | Mn | Co |
| --- | --- | --- | --- | --- |
| Pristine NMC622 | 1.014 | 0.601 | 0.197 | 0.201 |
| Spent NMC622 | 0.952 | 0.609 | 0.191 | 0.199 |
| Recycled NMC622 | 1.017 | 0.603 | 0.200 | 0.197 |

Example 5: Cycling Tests

Battery cells were prepared and tested using cathode powder prepared in accordance with Examples 2 and 3 using the following protocol.

Step 1. Electrode Preparation

Cathode preparation: (1) a slurry composed of cathode powder, conductive carbon, and binder (polyvinylidene fluoride) with a mass ratio of 9.4:0.3:0.3 was mixed using a planetary centrifugal mixer. (2) The slurry was casted on an Al foil current collector via Dr. blade. (3) The electrode was baked at 100° C. for 1 hour and then roll-pressed before overnight drying at 120° C. The mass loading of the cathode was controlled at ~20 mg cm$^2$.

Step 2. The electrode was cut into a diameter of 14 mm disk.

Step 3. CR20320 type coin cells were assembled in an argon-filled glove box using a polyethylene (PE) separator, a lithium counter electrode, and a LiPF$_6$-based carbonate electrolyte.

Step 4. The cells were rested in an Arbin cycler at 25° C. for 12 hours before electrochemical testing.

Figure 13:
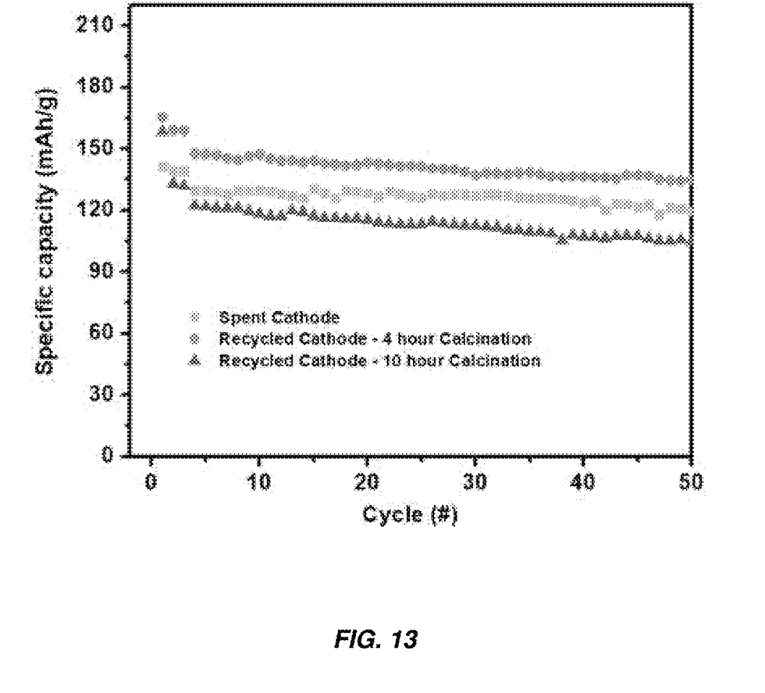
FIG. 13 is a chart showing the results of the cycling performance of spent and recycled cathode with different calcination times.

Step 5. Cycling tests were carried out with 3 formation cycles at 0.1C (1C=100% depth of discharge in 1 hour) and continuous cycling at C/3 between 2.7-4.2 V vs. Li$^{+/0}$ or 2.7-4.4 V vs. Li$^{+/0}$ FIG. 13 is a chart showing the results of the cycling performance of spent and recycled cathode with different calcination times. As depicted, it was found that the recycled cathode powder with 4 hours post-calcination showed the best performance with >90% capacity retention over 60 cycles. The capacity utilization recycled cathode is ~20 mAh/g higher than the spent cathode.

Figure 14:
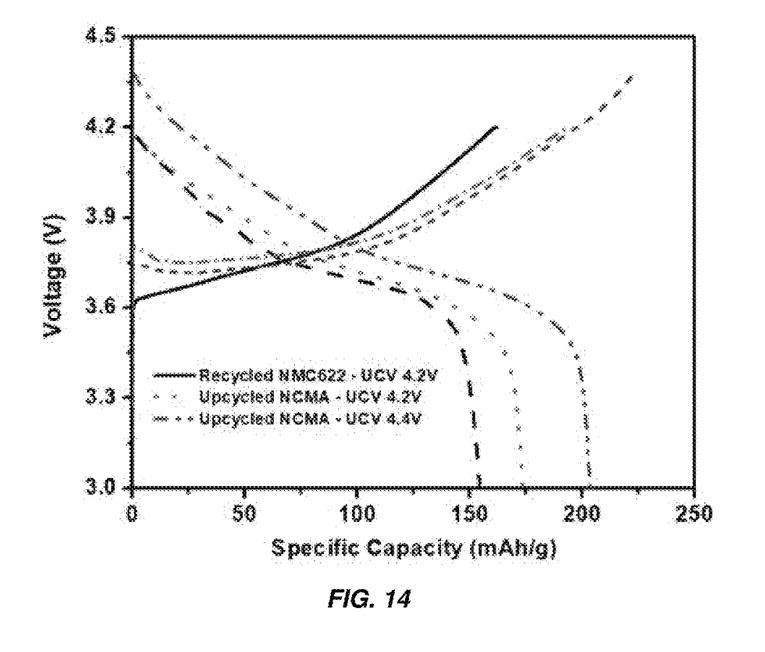
FIG. 14 is a chart comparing the resulting voltage profiles of recycled and upcycled cathodes.

FIG. 14 is a chart comparing the resulting voltage profiles of recycled and upcycled cathodes. As depicted, it was found that the upcycled cathode shows ~25 mAh/g higher capacity than the recycled cathode with the same 4.2 cut-off voltage.

With 4.4 V cut-off, the upcycled material can deliver 205 mAh/g capacity, —50 mAh/g higher than the recycled cathode.

While this disclosure has been described using certain embodiments, it can be further modified while keeping within its spirit and scope. This application is therefore intended to cover any variations, uses, or adaptations of the disclosure using its general principles. This application is intended to cover any and all such departures from the present disclosure as come within known or customary practices in the art to which it pertains, and which fall within the limits of the appended claims.

The invention claimed is:

1. A process for recycling spent cathode materials; the process comprising:
   obtaining cathode laminate from spent rechargeable batteries;
   grinding the cathode laminate to a powdered form;
   sifting the powdered cathode laminate into a hot stream of air to burn off contaminants;
   dispersing the sifted powdered cathode laminate into a leaching solution to dissolve metal oxides; and
   recovering cathode materials from the leaching solution containing dissolved metal oxides.

2. The process according to claim 1, wherein recovering cathode materials from the leaching solution comprises:
   mixing the leaching solution containing dissolved metal oxides with a solvent to create a precursor solution;
   spray drying the precursor solution to obtain dried metal salt particles;
   heat treating the dried metal salt particles to obtain calcined particles; and
   cooling calcined particles to obtain cathode materials suitable for use in a rechargeable battery cell.

3. The process according to claim 2, wherein mixing the leaching solution containing dissolved metal oxides with the solvent comprises mixing the leaching solution containing dissolved metal oxides with a solvent comprising glycerol, isopropanol, ethanol, or water.

4. The process according to claim 2, wherein mixing the leaching solution containing dissolved metal oxides with the solvent further comprises mixing a cathode material with the suitable solvent.

5. The process according to claim 4, wherein the cathode material is selected from the group consisting of lithium nitrate, lithium acetate, lithium hydroxide, lithium carbonate, lithium sulfate, lithium chloride, nickel nitrate, nickel acetate, nickel hydroxide, nickel carbonate, nickel sulfate, nickel chloride, cobalt nitrate, cobalt acetate, cobalt hydroxide, cobalt carbonate, cobalt sulfate, cobalt chloride, manganese nitrate, manganese acetate, manganese hydroxide, manganese carbonate, manganese sulfate, manganese chloride, aluminum nitrate, aluminum acetate, aluminum hydroxide, aluminum carbonate, aluminum sulfate, aluminum chloride, magnesium nitrate, magnesium acetate, magnesium hydroxide, magnesium carbonate, magnesium sulfate, magnesium chloride, niobium nitrate, niobium acetate, niobium hydroxide, niobium carbonate, sulfate, niobium chloride, tungsten nitrate, tungsten acetate, tungsten hydroxide, tungsten carbonate, tungsten sulfate, and tungsten chloride.

6. The process according to claim 2, wherein spray drying comprises injecting the precursor solution into the top of a chamber with a heated air current that defines a heat gradient from a bottom of the chamber to a top of the chamber.

7. The process according to claim 6, wherein the heated air current spirals vertically upwards in the chamber to define the heat gradient.

8. The process according to claim 2, wherein heat treating the dried metal salt particles to obtain calcined particles comprises passing the particles through a heating zone having a temperature of from about 600° C. to about 1000° C. for a sufficient time to produce calcined crystalline particles.

9. The process according to claim 1, wherein recovering cathode materials from the leaching solution comprises mixing the leaching solution containing dissolved metal oxides with an alkaline solution to create an electrolyte solution and performing electrodeposition on the electrolyte solution to collect a metal salt.

10. The process according to claim 9, wherein the metal salt is a salt of nickel, cobalt aluminum, manganese, magnesium, niobium, or tungsten.

11. The process according to claim 1, wherein dispersing the powder into a leaching solution to dissolve metal oxides comprises dispersing the powder into an acidic solution selected from the group consisting of acetate acid, sulfuric acid, and hydrochloride acid; or dispersing the powder into an alkaline solution selected from the group comprising sodium hydroxide, lithium hydroxide, and potassium hydroxide.

12. The process according to claim 2, wherein heat treating the dried metal salt particles to obtain calcined particles comprises passing the dried metal salt particles through a flame assisted heating zone of a cathode recycling system.

13. The process according to claim 12, wherein passing the dried metal salt particles through the flame assisted heating zone of a cathode recycling system, comprises carrying the dried metal salt particles on a continuous airflow maintained in the cathode recycling system.

* * * * *